(12) United States Patent
Chang et al.

(10) Patent No.: US 8,238,091 B2
(45) Date of Patent: Aug. 7, 2012

(54) LOCKING MECHANISMS FOR LOCKING HARD DISK DRIVES TO ELECTRONIC DEVICES

(75) Inventors: Chih-Kai Chang, Taipei Hsien (TW); Song Gao, Shanghai (CN); Cai-Wen Xu, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 238 days.

(21) Appl. No.: 12/790,852

(22) Filed: May 31, 2010

(65) Prior Publication Data

US 2010/0309621 A1     Dec. 9, 2010

(30) Foreign Application Priority Data

Jun. 9, 2009   (CN) .......................... 2009 1 0303067

(51) Int. Cl.
*H05K 5/00* (2006.01)
*H05K 7/00* (2006.01)
(52) U.S. Cl. ......... 361/679.39; 361/679.33; 361/679.37; 361/679.38
(58) Field of Classification Search ............. 361/679.33, 361/679.37, 679.38, 679.39
See application file for complete search history.

(56) References Cited

U.S. PATENT DOCUMENTS

| | | | |
|---|---|---|---|
| 6,288,902 B1 * | 9/2001 | Kim et al. | 361/725 |
| 6,560,098 B1 * | 5/2003 | Beinor et al. | 361/679.39 |
| 6,565,163 B2 * | 5/2003 | Behl et al. | 312/223.1 |
| 6,648,149 B2 * | 11/2003 | Robertson | 211/26 |
| 7,110,250 B2 * | 9/2006 | Lee | 361/679.32 |

FOREIGN PATENT DOCUMENTS

| | | |
|---|---|---|
| CN | 2643374 | 9/2004 |
| CN | 2849909 | 12/2006 |

* cited by examiner

*Primary Examiner* — Anthony Haughton
(74) *Attorney, Agent, or Firm* — Altis Law Group, Inc.

(57) ABSTRACT

A locking mechanism includes a tray to receive a hard disk drive and a locking apparatus. The locking apparatus includes a base attached to a front wall of the tray, a handle pivotally connected to the base, and a locking member attached to the base. The base defines a receiving chamber and a mounting hole in communication with the receiving chamber. The locking member includes a sliding portion slidably received in the receiving chamber of the base to impel the handle to pivot relative to the base, and a locking tongue attached to the sliding portion. Movement of the locking tongue relative to the mounting hole causes the locking mechanism to toggle between a locked and unlocked position.

18 Claims, 6 Drawing Sheets

LOCKING MECHANISMS FOR LOCKING HARD DISK DRIVES TO ELECTRONIC DEVICES

BACKGROUND

1. Technical Field

The present disclosure relates to locking mechanisms, and particularly, to a locking mechanism which locks a hard disk drive in place.

2. Description of Related Art

Generally, a hard disk drive is locked in an electronic device using a number of fasteners. However, when replacing or repairing the hard disk drive, the fasteners need to be removed, which is inconvenient and time-consuming.

Therefore, it is desirable to provide a locking mechanism for locking a hard disk drive to an electronic device, which can overcome the above-mentioned problems.

DETAILED DESCRIPTION

Figure 1:
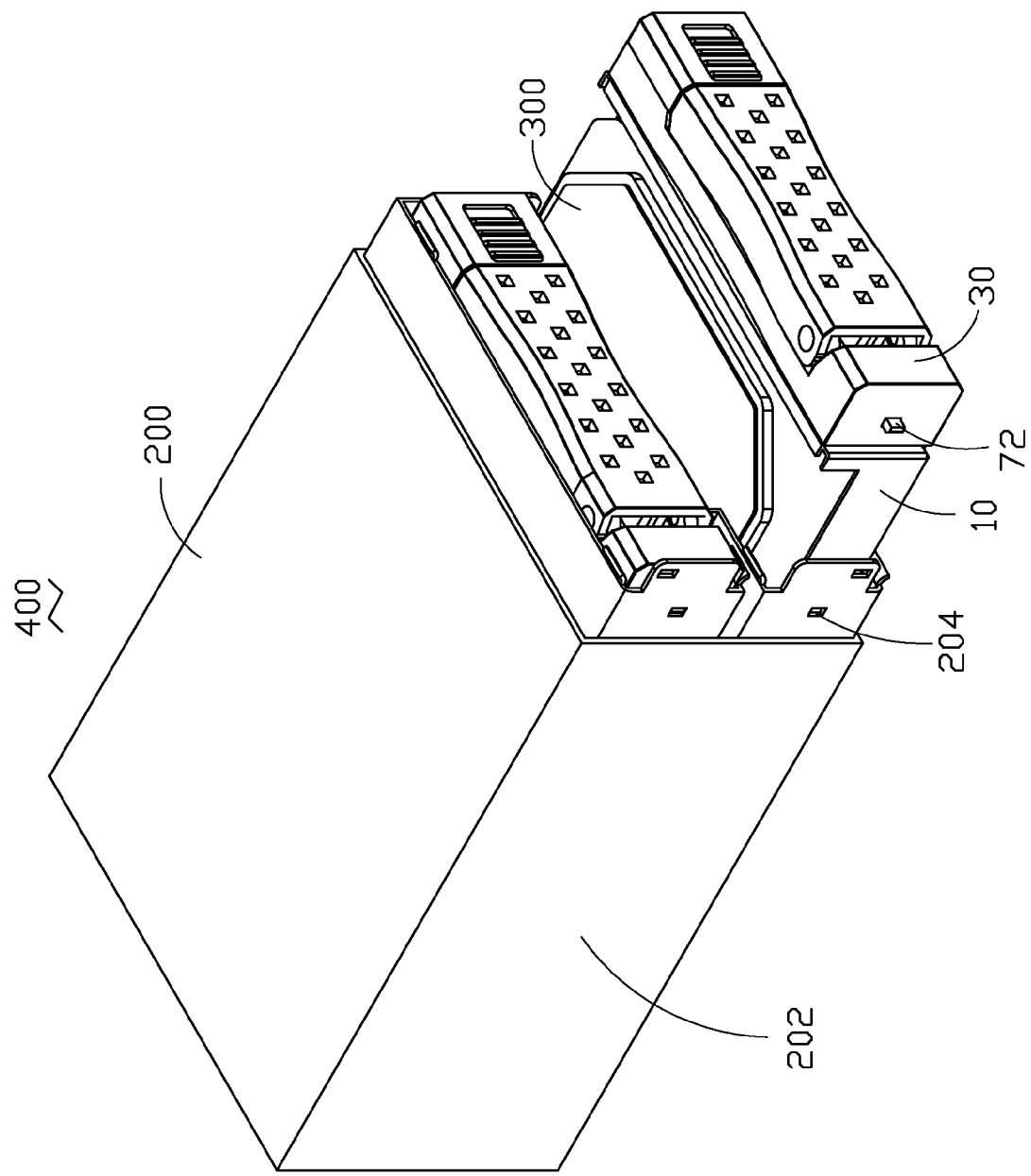
FIG. 1 is an assembled, isometric view of an exemplary embodiment of an electronic device.

FIG. 1 is an assembled, isometric view of an exemplary embodiment of an electronic device 400. The electronic device 400 includes an enclosure 200, a plurality of hard disk drives 300, and a plurality of locking mechanisms 100 (referring to FIG. 2) to release or lock the hard disk drives 300 from or in the enclosure 200. The electronic device 400 may be a computer, or a server, but the disclosure is not limited thereto.

The enclosure 200 includes a plurality of sidewalls 202. One of the sidewalls 202 defines a plurality of locating holes 204.

Figure 2:
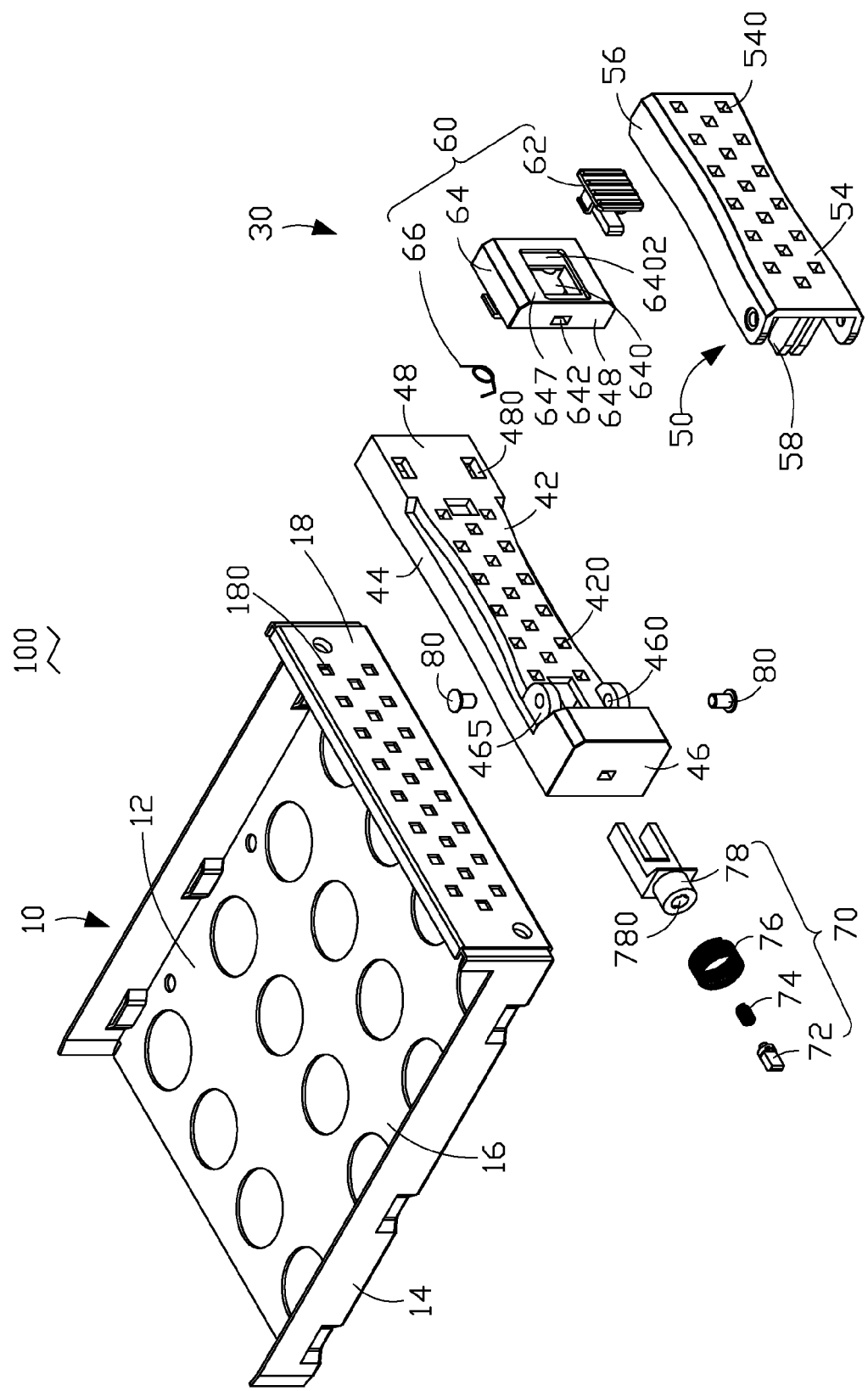
FIG. 2 is an exploded, isometric view of a locking mechanism of FIG. 1.

FIG. 2 is an exploded, isometric view of the locking mechanism 100. The locking mechanism 100 includes a tray 10 and a locking apparatus 30.

The tray 10 includes a plurality of sidewalls 14, a bottom wall 16, and a front wall 18. The sidewalls 14, the font wall 18, and the bottom wall 16 cooperatively define a receiving space 12 to receive a corresponding hard disk drive 300. A plurality of dissipation heat holes 180 are defined in the front wall 18.

Figure 3:
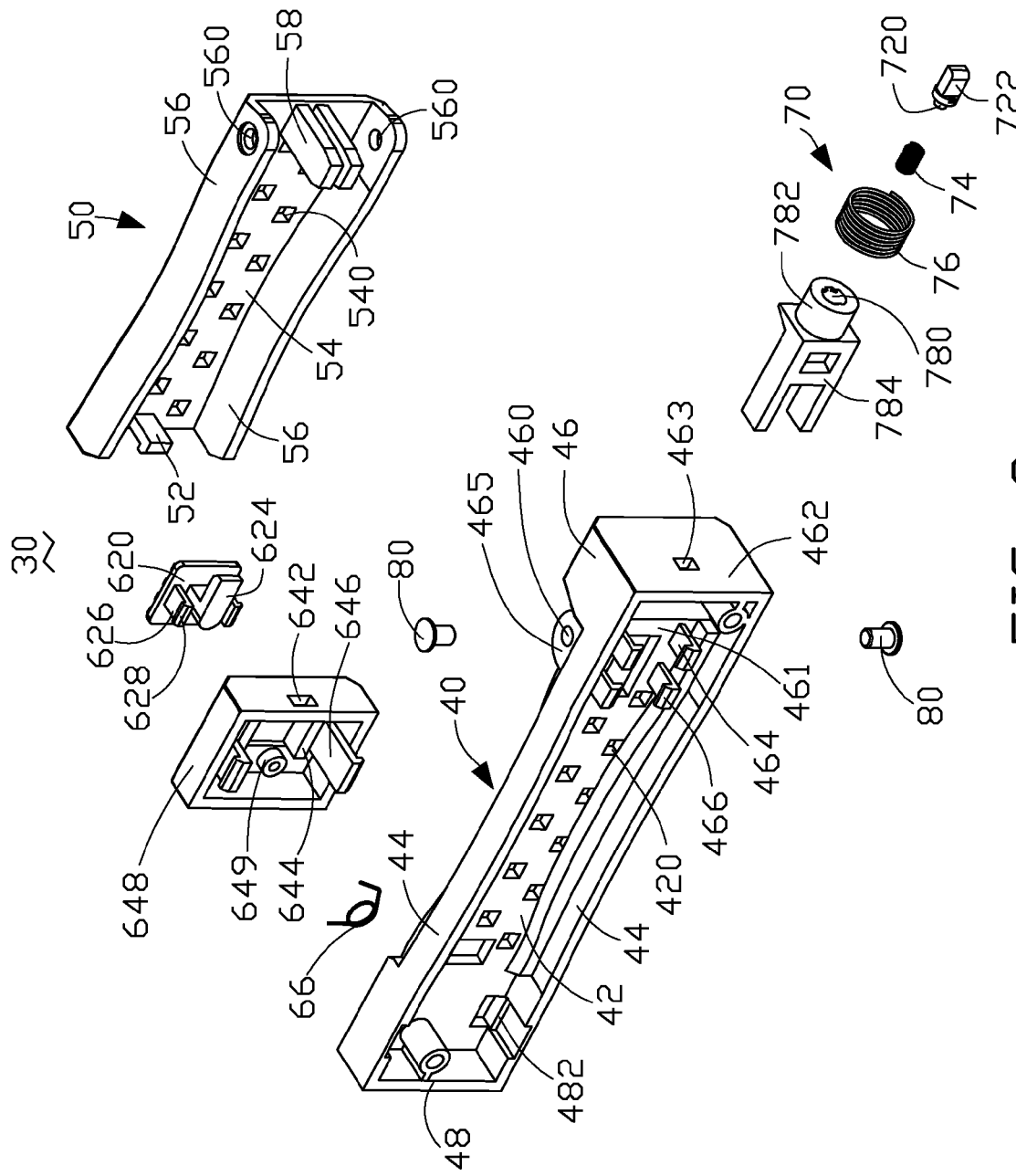
FIG. 3 is an exploded, isometric view of a locking apparatus of FIG. 2, viewed at a different angle.

FIG. 3 is an exploded, isometric view of the locking apparatus 30. The locking apparatus 30 includes a base 40 attached to the front wall 18 of the tray 10, a handle 50, a control member 60, a locking member 70, and a pair of locating pins 80.

The base 40 includes a first front cover 42, a pair of substantially parallel first sidewalls 44 extending from two opposite sides of the first front cover 42, a first end portion 46, and a second end portion 48 opposite to the first end portion 46. A thickness of the first end portion 46 is greater than a thickness of the second end portion 48. The first front cover 42 is a substantially rectangular plate, and defines a plurality of first through holes 420 corresponding to the dissipation heat holes 180 of the tray 18.

The first end portion 46 includes a receiving chamber 461 to accommodate the locking member 70, a front cover 462, a pair of connecting protrusions 465 adjacent to a corresponding first sidewall 44, and a plurality of guide protrusions 464. A mounting hole 463 is defined at a center of the front cover 462 and in communication with the receiving chamber 461. Each connecting protrusion 465 is semi-circular and defines a first connecting through hole 460 generally at a center of each connecting protrusion 465. Each guide protrusion 464 extends from a bottom surface of the first front cover 42 into the receiving chamber 461. In the illustrated embodiment, the guide protrusions 464 are arranged two rows each adjacent to a corresponding first sidewall 44. Each guide protrusion 464 includes a hook 466 located at a distal end thereof to form a pair of guide rails along which the locking member 70 slides.

The second end portion 48 defines a pair of receiving grooves 480. Each receiving grooves 480 includes a step portion 482 in one inner wall thereof.

The handle 50 is pivotably connected to the first end portion 46 of the base 40 and includes a locking projection 52, a second front cover 54, a pair of substantially parallel second sidewalls 56 extending from two opposite sides of the second front cover 54, and a pair of driving protrusions 58. The locking projection 52 extends from one end of a bottom surface of the second front cover 54. The second front cover 54 is a substantially rectangular plate and defines a plurality of second through holes 540 corresponding to the first through holes 420 and the dissipation heat holes 180 to dissipate heat generated by the corresponding hard disk drive 300. Each second sidewall 56 defines a second connecting through holes 560 corresponding to the first connecting through holes 460. Each of the driving protrusions 58 extends from the other end of the bottom surface of the second front cover 54 between the first sidewalls 56. The distance between the connecting protrusions 465 is slightly shorter than the distance between the second sidewalls 56.

The control member 60 is configured to lock or unlock the handle 50. The control member 60 includes a control 62, a main body 64, and a torsion spring 66.

The main body 64 includes a top wall 647, a plurality of sidewalls 648, a receiving hole 640 defined in a middle portion of the top wall 647, a receiving hole 642 defined in a middle portion of one of the sidewalls 648 and in communication with the receiving hole 640, a pair of locating blocks 644, a pair of locating hooks 646 adjacent to a corresponding sidewall 648, and a first post 649 adjacent to one of the sidewalls 648. The receiving hole 640 is a step hole, and a positioning portion 6402 is formed in the inner of the receiving hole 640. Each of the locating blocks 644 extends from a bottom surface of the positioning portion 6402 toward the base 40. Each of the locating hooks 646 extends from a bottom surface of the top wall 647 toward the base 40. In assembly, the locating hooks 646 clasp the step portions 482 through the receiving grooves 480 to fix the main body 64 on second end portion 48 of the base 40.

The control 62 is movably mounted on the main body 64 to lock or unlock the handle 50. The control 62 includes a pressing portion 620, a substantially L-shaped locking portion 624 slidably received in the receiving hole 642 of the main body 64, and a pair of fixing portions 626. The locking portion 624 extends from a middle portion of a bottom surface of the pressing portion 620. Each of the fixing portions 626 extends from the bottom surface of the pressing portion 620, and the locking portion 624 is between the fixing portions 626. Each of the fixing portions 626 includes a fixing hook 628 located at a distal end of each of the fixing portions 626. The control 62 is attached to the main body 64 via the fixing hooks 628 clasping the locating blocks 644 of the main body 64.

The torsion spring 66 is attached to the first post 649. One end of the torsion spring 66 abuts against one of the sidewalls 648 of the main body 64, and the other end of the torsion spring 66 abuts against the locking portion 624 of the control 62.

The locking member 70 includes a locking tongue 72, a first spring 76, a second spring 74, and a sliding portion 78. The sliding portion 78 is slidably received in the receiving chamber 461 of the base 40, and can slide along the hooks 466. The sliding portion 78 includes a positioning hole 780, a fixing post 782, and a moving portion 784. The fixing post 782 projects from a middle portion of the moving portion 784, and the positioning hole 780 is defined in a middle portion of the fixing post 782. A width of the moving portion 784 is greater than a diameter of the fixing post 782. The locking tongue 72 includes a locating portion 722 slidably received in the mounting hole 463 of the base 40, and a locating post 720 extruding from a middle portion of the locating portion 722. A diameter of the locating post 720 is less than a width of the locating portion 722. In assembly, the sliding portion 78 is received in the receiving chamber 461 of the base 40. The first spring 76 is wrapped around the fixing post 782 and is between the front cover 462 of the base 40 and the moving portion 784. The locating portion 722 is movably received in the mounting hole 463 of the base 40. The second spring 74 is wrapped around the locating post 720, and the second spring 74 and the locating post 720 are received in the positioning hole 780 of the sliding portion 78.

Figure 4:
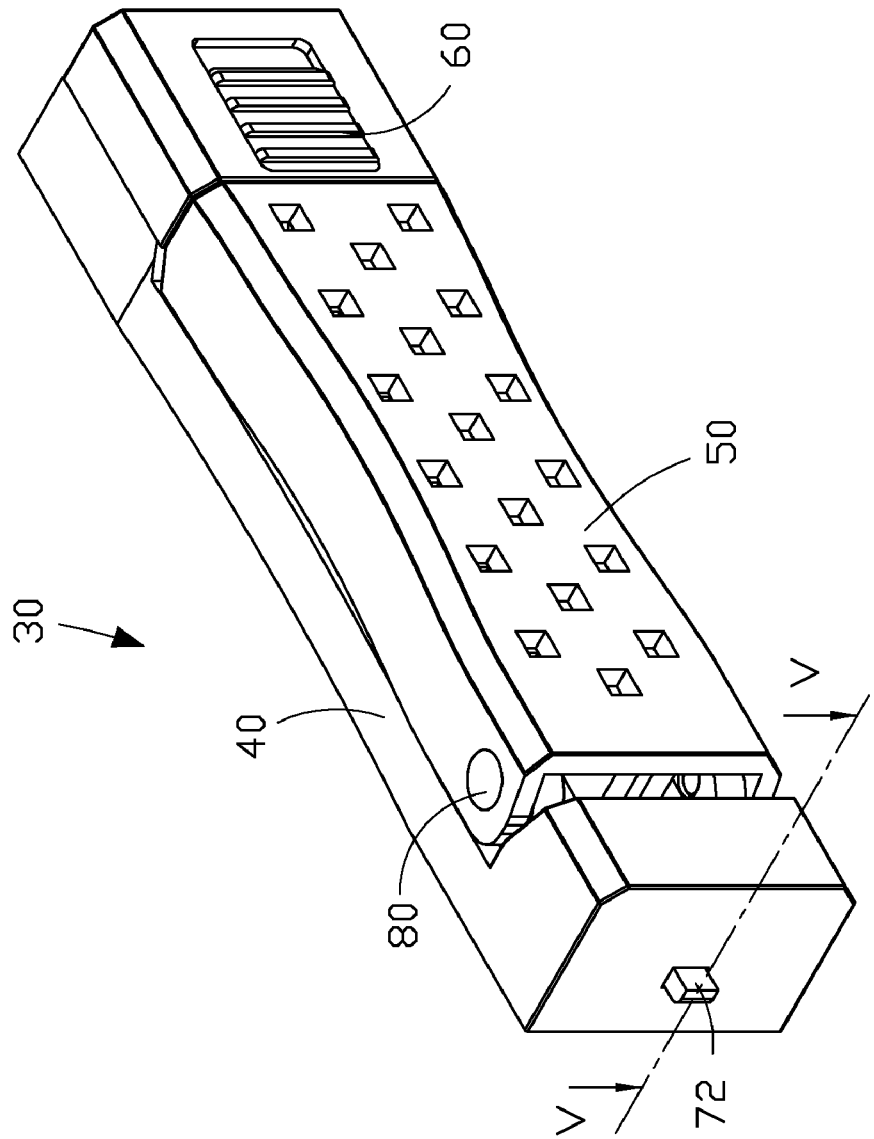
FIG. 4 is an assembled, isometric view of the locking apparatus of FIG. 3.

FIG. 4 is an assembled, isometric view of the locking apparatus 30. In assembly, the control member 60 is attached to the base 40 with the locating hooks 646 clasping the step portions 482. The locking member 70 is received in the receiving chamber 461 of the base 40. The locating pins 80 are mounted in the first connecting through holes 460 through the second connecting through hole 560 so that the handle 50 is pivotally connected to the first end portion 46 of the base 40. Thus, the handle 50, the base 40, the control member 60, and locking member 70 are assembled into the locking apparatus 30. Referring to FIG. 1, each of the locking apparatus 30 is attached to the front wall 18 of the tray 10 with the corresponding hard disk drive 300 being received in the receiving space 12. Each of the locking mechanisms 100 is received in the enclosure 200 with the locking tongue 72 being received in a corresponding locating hole 204. Thus, the locking mechanisms 100, the hard disk drives 300, and the enclosure 200 are assembled into the electronic device 400.

Figure 5:
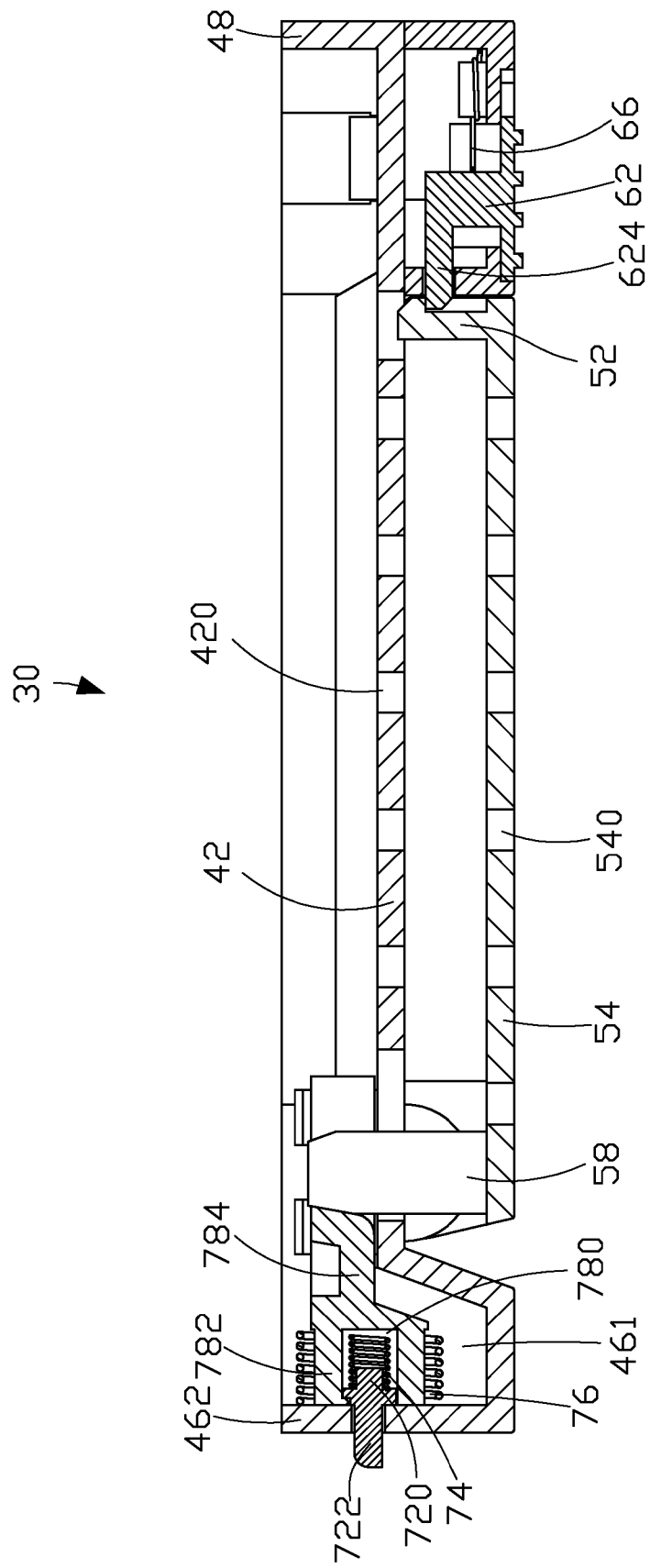
FIG. 5 is cross-section view taken along line V-V of FIG. 4, showing the locking apparatus in a locked position.

FIG. 5 is an assembled view of the locking apparatus 30 in a locked position. In the locked position, the corresponding hard disk drive 300 is locked in the enclosure 200 by the locking mechanism 100. Each of the locking tongues 72 of the locking apparatus 30 is inserted into the corresponding locating hole 204 of the enclosure 200. The second spring 74 is in an original position, and the first spring 76 is compressed. The locking projections 52 of the handle 50 are locked by the locking portion 624 of the control member 60.

Figure 6:
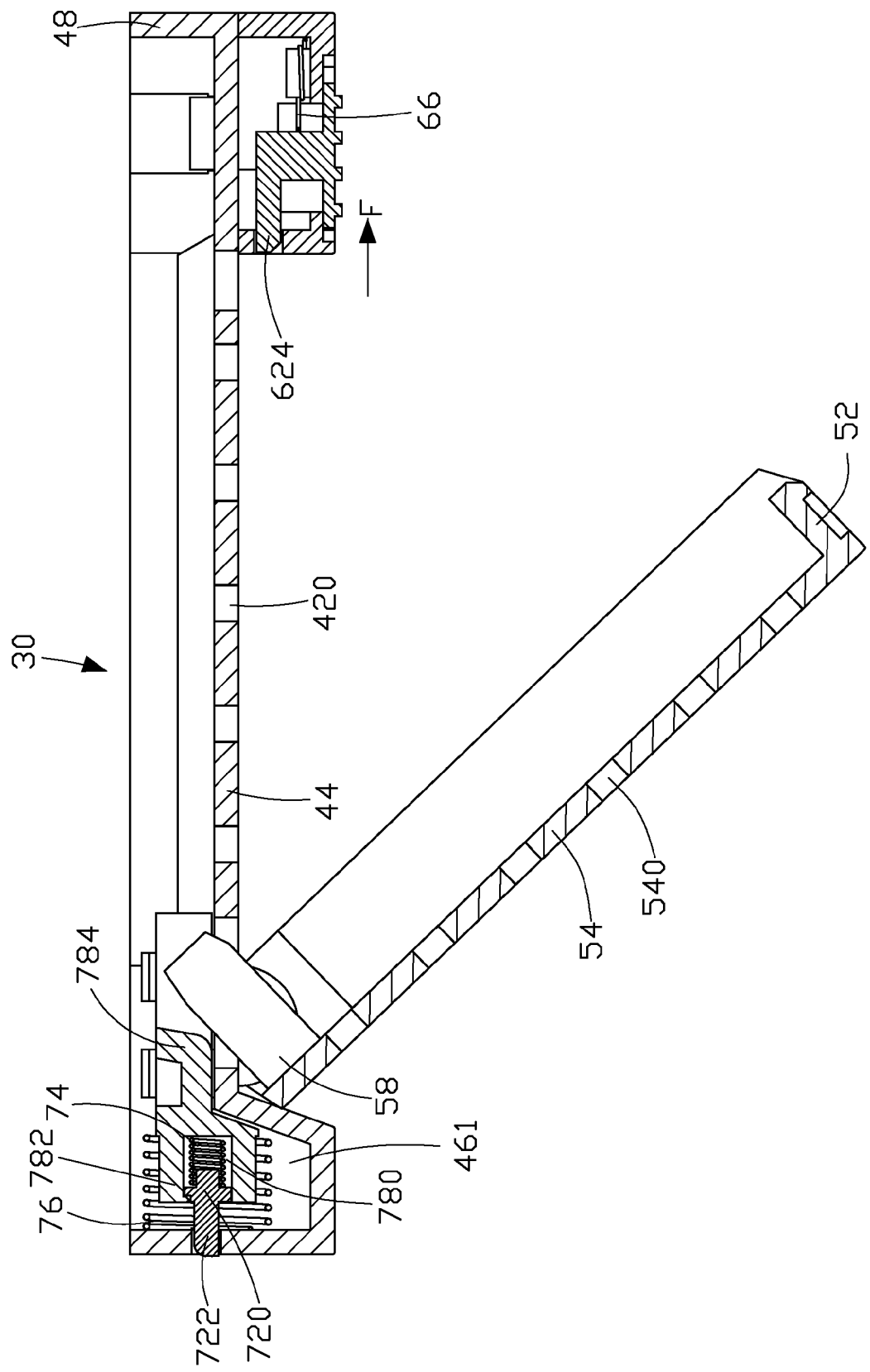
FIG. 6 is similar to FIG. 5, but showing the locking apparatus in an unlocked position.

FIG. 6 is an assembled view of the locking apparatus 30 in an unlocked position. In the unlocked position, the corresponding hard disk drive 300 can be released by the locking mechanism 100 from the enclosure 200, facilitating replacing or repairing the corresponding hard disk drive 300.

Also referring to FIGS. 5 and 6, in use, the control 62 of the control member 60 is impelled relative to the base 40 and moves toward the second end portion 48 until the locking projection 52 of the handle 50 is disengaged from the locking portion 624 of the control 62, relocating the locking apparatus 30 being in the unlocked position. In the unlocked position, the first spring 76 decompresses and moves the sliding portion 78 toward the second end portion 78 with the moving portion 784 of the locking member 70 applying a corresponding force to the driving protrusions 58 of the handle 50 to impel the handle 50 to pivot away from the base 40, while the locking portion 722 of the locking tongue 72 moves from the locating hole 204 into the mounting hole 463 so that the second spring 74 is compressed. The locking mechanism 100 is in an unlocked position and can be disengaged from the enclosure 200.

After the corresponding hard disk drive 300 is released from or locked in the enclosure 200, the handle 50 is pivoted to the base 40, the second spring 74 decompresses and moves the locking portion 722 of the locking tongue 72 from the mounting hole 463 of the base 40 into the locating hole 204 of the enclosure 200 so that the corresponding hard disk drive 300 is locked in the enclosure 200. In the locked position, the locking mechanism 100 is in a locked position and cannot be accidently disengaged from the enclosure 200 during use or transportation, avoiding damage of the corresponding hard disk drive 300.

Specially, movement of the locking tongue 72 between the mounting hole 463 of the base 40 and the locating hole 204 of the enclosure 200 causes the locking mechanism 100 to toggle between a locked and unlocked position.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device, comprising:
   an enclosure comprising a plurality of sidewalls, one of the sidewalls defining at least one locating hole;
   at least one hard disk drive; and
   at least one locking mechanism to release or lock the at least one hard disk drive from or in the enclosure, the at least one locking mechanism comprising a tray and a locking apparatus, the tray comprising a front wall and a receiving space to receive the at least one hard disk drive, the locking apparatus comprising:
   a base attached to the front wall, the base comprising a first end portion and a second end portion opposite to the first end portion, the first end portion defining a receiving chamber and a mounting hole in communication with the receiving chamber;
   a handle pivotally connected to the first end portion of the base;
   a control member attached to the second end portion of the base to lock or unlock the handle; and
   a locking member mounted in the first end portion of the base, the locking member comprising a sliding portion slidably received in the receiving chamber of the base to drive the handle to pivot relative to the base, and a locking tongue attached to the sliding portion, wherein movement of the locking tongue between the mounting hole and the locating hole causes the at least one locking mechanism to toggle between a locked and unlock position.

2. The electronic device as recited in claim 1, wherein the sliding portion comprises a moving portion, a fixing post projecting from a middle portion of the moving portion, and a positioning hole defined in a middle portion of the fixing post.

3. The electronic device as recited in claim 2, wherein the locking tongue comprises a locating post and a locating portion slidably received in the mounting hole of the base.

4. The electronic device as recited in claim 3, wherein the locking apparatus further comprises a first spring wrapped around the fixing post.

5. The electronic device as recited in claim 4, wherein the handle comprises a pair of driving protrusions, and wherein when the handle is unlocked by the control member, the first spring decompresses and moves the sliding portion toward the second end portion with the moving portion of the locking member applying a corresponding force to the driving protrusions of the handle to impel the handle to pivot away from the base and the locking tongue from the locating hole into the mounting hole.

6. The electronic device as recited in claim 3, wherein the locking apparatus further comprises a second spring wrapped around the locating post, and wherein the second spring and the locating post are received in the positioning hole.

7. The electronic device as recited in claim 6, wherein when the handle is locked by the control member, the second spring decompresses and moves the locking portion from the mounting hole into the locating hole.

8. The electronic device as recited in claim 2, wherein the first end portion of the base comprises a plurality of guide protrusions projecting into the receiving chamber.

9. The electronic device as recited in claim 8, wherein each of the guide protrusions comprises a hook located at a distal end thereof to form a pair of guide rails along which the locking member slides.

10. A locking mechanism to release or lock a hard disk drive from or in an enclosure of an electronic device, the locking mechanism comprising:
a tray comprising a front wall and a receiving space to receive the hard disk drive; and
a locking apparatus comprising:
a base attached to the front wall, the base defining a receiving chamber and a mounting hole in communication with the receiving chamber;
a handle pivotally connected to the base; and
a locking member attached to the base, the locking member comprising a sliding portion slidably received in the receiving chamber of the base to impel the handle to pivot relative to the base, and a locking tongue attached to the sliding portion, wherein movement of the locking tongue relative to the mounting hole causes the locking mechanism to toggle between a locked and unlock position.

11. The locking mechanism as recited in claim 10, wherein the sliding portion comprises a moving portion, a fixing post projecting from a middle portion of the moving portion, and a positioning hole defined in a middle portion of the fixing post.

12. The locking mechanism as recited in claim 11, wherein the locking tongue comprises a locating post and a locating portion slidably received in the mounting hole of the base.

13. The locking mechanism as recited in claim 12, wherein the locking apparatus further comprises a first spring wrapped around the fixing post.

14. The locking mechanism as recited in claim 13, wherein the handle comprises a pair of driving protrusions, and wherein when the locking mechanism is in the unlocked position, the first spring decompresses and moves the sliding portion with the moving portion of the locking member applying a corresponding force to the driving protrusions of the handle to impel the handle to pivot away from the base and the locking portion into the mounting hole.

15. The locking mechanism as recited in claim 12, wherein the locking apparatus further comprises a second spring wrapped around the locating post, and wherein the second spring and the locating post are received in the positioning hole.

16. The locking mechanism as recited in claim 15, wherein when the locking mechanism is in the locked position, the second spring decompresses and moves the locking portion out of the mounting hole.

17. The locking mechanism as recited in claim 11, wherein the first end portion of the base comprises a plurality of guide protrusions projecting into the receiving chamber.

18. The locking mechanism as recited in claim 17, wherein each of the guide protrusions comprises a hook located at a distal end thereof to form a pair of guide rails along which the locking member slides.

* * * * *